United States Patent
Tanaka

(10) Patent No.: US 10,138,339 B2
(45) Date of Patent: Nov. 27, 2018

(54) SOLAR CELL BACK SHEET FILM AND METHOD FOR PRODUCING THE SAME

(75) Inventor: Shinji Tanaka, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 949 days.

(21) Appl. No.: 13/521,406

(22) PCT Filed: Jan. 18, 2011

(86) PCT No.: PCT/JP2011/051156
§ 371 (c)(1),
(2), (4) Date: Jul. 10, 2012

(87) PCT Pub. No.: WO2011/087156
PCT Pub. Date: Jul. 21, 2011

(65) Prior Publication Data
US 2012/0295101 A1    Nov. 22, 2012

(30) Foreign Application Priority Data
Jan. 18, 2010   (JP) ................................ 2010-008597

(51) Int. Cl.
*B32B 27/20* (2006.01)
*G02B 5/08* (2006.01)
*C08J 7/04* (2006.01)

(52) U.S. Cl.
CPC ........... *C08J 7/042* (2013.01); *C08J 2367/02* (2013.01); *C08J 2423/02* (2013.01); *Y10T 428/265* (2015.01); *Y10T 428/2848* (2015.01)

(58) Field of Classification Search
CPC ......... B32B 27/08; B32B 27/28; B32B 27/36; Y10T 428/2848; Y10T 428/264
See application file for complete search history.

(56) References Cited

U.S. PATENT DOCUMENTS

| | | | |
|---|---|---|---|
| 3,353,958 A | 11/1967 | Moede | |
| 2003/0204010 A1* | 10/2003 | Iwata et al. | .................. 524/501 |
| 2008/0050583 A1 | 2/2008 | Kubo | |
| 2011/0083726 A1 | 4/2011 | Takayanagi et al. | |
| 2011/0223419 A1* | 9/2011 | Okawara et al. | ...... 428/355 EN |

FOREIGN PATENT DOCUMENTS

| | | | |
|---|---|---|---|
| CN | 101290950 A | 10/2008 | |
| CN | 101582458 A | 11/2009 | |
| JP | 2000-114565 A | 4/2000 | |
| JP | 2001-89616 A | 4/2001 | |
| JP | 2006-073793 A | 3/2006 | |
| JP | 2006-210557 A | 8/2006 | |
| JP | 2006-335853 A | 12/2006 | |
| JP | 2007-306006 A | 11/2007 | |
| JP | 2008-270238 A | 11/2008 | |
| JP | 2009-81394 A | 4/2009 | |
| JP | 2009-094320 A | 4/2009 | |
| WO | 2008/157159 A1 | 12/2008 | |
| WO | 2009/157449 A1 | 12/2009 | |
| WO | WO2010005029 | * | 1/2010 |

OTHER PUBLICATIONS

Chinese Office Action dated Apr. 3, 2014, issued in Chinese Patent Application No. 201180005800.7.
International Search Report for PCT/JP2011/051156 dated Apr. 28, 2011.
Written Opinion of the International Searching Authority for PCT/JP2011/051156 dated Apr. 28, 2011.
Japanese Office Action dated Oct. 14, 2014, issued in corresponding Japanese Patent Application No. 2010-008597.
Chinese Office Action for Chinese Application No. 201180005800.7 dated Oct. 12, 2013 with English translation.
Japanese Office Action dated Feb. 4, 2014, issued in Japanese Patent Application No. 2010-008597.
Korean Office Action dated Sep. 24, 2015, issued in corresponding Korean Patent Application No. 2012-7017620 (with English translation).
European Office Action dated Sep. 5, 2016, issued in European Patent Application No. 11702086.7.
Chinese Office Action dated May 6, 2013 issued in corresponding Chinese patent application No. 201180005800.7 (English translation provided).
Chinese Office Action dated Apr. 17, 2017, issued in Chinese Patent Application No. 201610011941.4, with partial English translation.
Chinese Office Action for Chinese Application No. 201610011941.4 dated Jan. 25, 2017 with English translation.
Chinese Office Action dated Apr. 24, 2015, issued in Chinese Application No. 20118005800.7, with partial English Translation.

* cited by examiner

*Primary Examiner* — Samir Shah
(74) *Attorney, Agent, or Firm* — Birch, Stewart, Kolasch & Birch, LLP

(57) ABSTRACT

The present invention provides a film for a solar cell back sheet including: a substrate film; a white layer on at least one surface of the substrate film; and an adhesive protective layer, the white layer being formed by applying an aqueous composition for the white layer including a white pigment, a first aqueous binder and an inorganic oxide filler to at least one surface of the substrate film, and the adhesive protective layer being formed by applying an aqueous composition for the adhesive protective layer including a second aqueous binder, and which has excellent production efficiency, a white pigment uniformly present in the layers, and excellent adhesiveness between the respective layers, and a producing method of the film for a solar cell back sheet.

22 Claims, No Drawings

SOLAR CELL BACK SHEET FILM AND METHOD FOR PRODUCING THE SAME

BACKGROUND OF THE INVENTION

Technical Field

The present invention relates to a film for a solar cell back sheet and a method for producing the film.

Background Art

A solar cell module having crystalline silicon, amorphous silicon or the like as a solar cell element is generally produced by using a lamination method of laminating a front surface protective sheet layer, a filler layer, a solar cell element which is a photovoltaic element, a filler layer, and a rear surface protective sheet layer in this sequence, and hot pressing the laminate by vacuum suctioning. Since solar cells are placed in an environment exposed to sunlight and exposed to rain, such as on top of a roof, the respective layers constituting the solar cell module are required to have weather resistant functions such as a moisture-proof property, heat resistance and ultraviolet resistance.

The rear surface protective sheet layer is required to satisfy the conditions of, for example, having excellent strength and general robustness such as weather resistance, heat resistance, water resistance, lightfastness, wind pressure resistance, hailstorm resistance, chemical resistance, light reflectivity, light diffusibility and designability, particularly having an excellent moisture-proof property that prevents penetration of moisture, oxygen and the like, having high surface hardness, having an excellent anti-fouling property that prevents accumulation of fouling, dust and the like on the surface and very high durability, and having high protective capability.

For example, it is an aim to construct a safe solar cell module that is excellent in general properties such as a moisture-proof property, resistance to long-term performance deterioration, durability, and protective capability, at lower cost, and a rear surface protective sheet for a solar cell module has been proposed in which a heat resistant polypropylene-based resin film containing a whitening agent and an ultraviolet absorbent is laminated on both surfaces of a substrate film provided with a deposition film of an inorganic oxide (see, for example, Japanese Patent Application Laid-Open (JP-A) No. 2007-306006).

Furthermore, in addition to the functionality of the rear surface protective sheet layer itself, the productivity of the rear surface protective sheet is also an important concern, and thus there is also demand for a method for producing a rear surface protective sheet for solar cells having higher production efficiency. In general, the rear surface protective sheet for solar cells has a laminate structure including a substrate, a white layer having a sunlight-reflecting function, and various functional layers, in which the layers are mainly formed from resin films. The rear surface protective sheet is produced by affixing the respective resin films thereto.

In this regard, in order to improve the efficiency of production and fabrication of back sheets, a back sheet for solar cells has been suggested which is produced by subjecting a first resin film layer 11, a white colored layer 12, a gas barrier deposition resin film layer 13, and a second resin film layer 14 to a heat annealing treatment, and thereby imparting low shrinkability (see, for example, Japanese Patent No. 2006-073793).

A rear surface protective sheet for solar cells has also been disclosed which is formed from a substrate film, a white ink layer, and an inorganic deposit film, for the purpose of obtaining a protective sheet which has an excellent weather resistance, heat resistance, water resistance, light-fastness, wind pressure resistance, hailstorm resistance, chemical resistance, moisture proofing property, antifouling property, designability, light reflectivity, voltage resistance, and other various required properties, and has an excellent ability to reflect incident light, and which is capable of being formed and fabricated by a general-purpose method, is safe and inexpensive, and has excellent durability, so as to increase the power conversion efficiency (see, for example, Japanese Patent No. 2006-210557).

SUMMARY OF THE INVENTION

According to an aspect of the invention, a film for a solar cell back sheet is provided which includes: a substrate film; a white layer provided on at least one surface of the substrate film and formed from a coating film of an aqueous composition for the white layer including a white pigment, a first aqueous binder and an inorganic oxide filler; and an adhesive protective layer provided on the least one surface of the substrate film and formed from a coating film of an aqueous composition for the adhesive protective layer including a second aqueous binder, and which has excellent production efficiency, a white pigment uniformly present in the layers, and excellent adhesiveness between the respective layers, and a method of producing the film for a solar cell back sheet is also provided.

Technical Problem

The rear surface protective sheets for solar cells described in the above-mentioned patent documents are such that the completion of the rear surface protective sheets for solar cells, which are laminate sheets, cannot be achieved without processes of affixing respective layers together. Therefore, production efficiency is insufficient, and adhesiveness between the respective layers is also insufficient.

It is an aim of the invention to provide a film for a solar cell back sheet having excellent production efficiency, having a white pigment uniformly present in the layers, and having excellent adhesiveness between the respective layers, and a method for producing the film.

Solution to Problem

Exemplary embodiments of the present invention include the following.

<1> A method for producing a film for a solar cell back sheet, including: forming a white layer on a substrate film by applying an aqueous composition for the white layer including a white pigment, a first aqueous binder and an inorganic oxide filler to at least one surface of the substrate film; and forming an adhesive protective layer on the substrate film by applying an aqueous composition for the adhesive protective layer including a second aqueous binder to the at least one surface of the substrate film.

<2> The method for producing a film for a solar cell back sheet according to the item <1>, wherein a volume fraction of the white pigment in the aqueous composition for the white layer is in a range of from 50% to 200% relative to the first aqueous binder, and the aqueous composition for the white layer is applied to the substrate film such that a coating thickness of the aqueous composition for the white layer is in a range of from 4 μm to 20 μm, and a coating amount of the white pigment is in a range of from 3 g/m² to 10 g/m².

<3> The method for producing a film for a solar cell back sheet according to the item <1> or the item <2>, wherein a content of the inorganic oxide filler is in a range of from 5% by mass to 400% by mass relative to a total amount of the first aqueous binder in the aqueous composition for the white layer.

<4> The method for producing a film for a solar cell back sheet according to any one of the items <1> to <3>, further including applying an aqueous composition for a weather resistant layer including at least one of a fluorocarbon resin or a silicone-acrylic composite resin, to a surface opposite to the at least one surface at which the white layer and the adhesive protective layer are formed.

<5> The method for producing a film for a solar cell back sheet according to any one of the items <1> to <4>, wherein a light reflection ratio of the at least one surface side of the substrate film at which the white layer and the adhesive protective layer are formed is 70% or higher with respect to light having a wavelength of 550 nm.

<6> The method for producing a film for a solar cell back sheet according to any one of the items <1> to <5>, wherein the aqueous composition for the white layer further includes at least one surfactant.

<7> The method for producing a film for a solar cell back sheet according to any one of the items <1> to <6>, wherein the first aqueous binder and the second aqueous binder respectively independently include at least one selected from the group consisting of polyolefin, polyurethane, polyvinyl alcohol, (meth)acrylic polymer and polyester.

<8> The method for producing a film for a solar cell back sheet according to any one of the items <1> to <7>, wherein the aqueous composition for the adhesive protective layer further includes an inorganic oxide filler.

<9> The method for producing a film for a solar cell back sheet according to any one of the items <1> to <8>, wherein the substrate film includes polyester.

<10> The method for producing a film for a solar cell back sheet according to any one of the items <1> to <9>, wherein the aqueous composition for the white layer further includes at least one oxazoline compound as a crosslinking agent for the first aqueous binder.

<11> A film for a solar cell back sheet including: a substrate film; a white layer provided on at least one surface of the substrate film and including a coating film of an aqueous composition for the white layer including a white pigment, a first aqueous binder and an inorganic oxide filler; and an adhesive protective layer provided on the at least one surface of the substrate film and including a coating film of an aqueous composition for the adhesive protective layer including a second aqueous binder.

<12> The film for a solar cell back sheet according to the item <11>, wherein a volume fraction of the white pigment in the aqueous composition for the white layer is in a range of from 50% to 200% relative to the first aqueous binder, a film thickness of the white layer is in a range of from 4 µm to 20 µm, and a coating amount of the white pigment is in a range of from 3 g/m$^2$ to 10 g/m$^2$.

<13> The film for a solar cell back sheet according to the item <11> or the item <12>, wherein a content of the inorganic oxide filler is in a range of from 5% by mass to 400% by mass relative to a total amount of the first aqueous binder in the white layer.

<14> The film for a solar cell back sheet according to any one of the items <11> to <13>, further including a weather resistant layer including a coating film of an aqueous composition for the weather resistant layer including at least one of a fluorocarbon resin or a silicone-acrylic composite resin, and provided on a surface opposite to the at least one surface at which the white layer and the adhesive protective layer are provided.

<15> The film for a solar cell back sheet according to any one of the items <11> to <14>, wherein a light reflection ratio of the at least one surface side of the substrate film at which the white layer and the adhesive protective layer are provided is 70% or higher with respect to light having a wavelength of 550 nm.

<16> The film for a solar cell back sheet according to any one of the items <11> to <15>, wherein the first aqueous binder and the second aqueous binder respectively independently include at least one selected from the group consisting of polyolefin, polyurethane, polyvinyl alcohol, (meth)acrylic polymer and polyester.

<17> The film for a solar cell back sheet according to any one of the items <11> to <16>, wherein the adhesive protective layer further includes an inorganic oxide filler.

<18> The method for producing a film for a solar cell back sheet according to any one of the items <11> to <17>, wherein the substrate film includes polyester.

<19> The method for producing a film for a solar cell back sheet according to any one of the items <11> to <18>, wherein the aqueous composition for the white layer further includes at least one oxazoline compound as a crosslinking agent for the first aqueous binder.

DESCRIPTION OF EMBODIMENTS

<Method for Producing Film for a Solar Cell Back Sheet>

The method for producing a film for a solar cell back sheet of the invention includes forming a white layer on a substrate film by applying an aqueous composition for the white layer containing a white pigment, a first aqueous binder and an inorganic oxide filler to at least one surface of the substrate film, and forming an adhesive protective layer on the substrate film by applying an aqueous composition for an adhesive protective layer containing a second aqueous binder to at least one surface of the substrate film.

The method for producing a film for a solar cell back sheet of the invention may further include a step of applying an aqueous composition for a weather resistant layer containing at least one of a fluorocarbon resin or a silicone-acrylic composite resin, to a surface opposite to the at least one surface at which the white layer and the adhesive protective layer are formed. Furthermore, the method may have, before forming a white layer by applying an aqueous composition for a white layer on a substrate film, a step of forming an undercoat layer by applying an aqueous composition for an undercoat layer between the substrate film and the white film.

When the method for producing a film for a solar cell back sheet has the configuration as described above, a film for a solar cell back sheet can be produced simply by applying (coating), without affixing the respective layers that constitute the film for a solar cell back sheet thereto. Therefore, the production efficiency for the film for a solar cell back sheet can be enhanced.

Furthermore, in the method for producing a film for a solar cell back sheet of the invention, the white layer and the adhesive protective layer are formed by applying aqueous compositions containing an aqueous binder. Therefore, the respective aqueous compositions can form a coating film having a small thickness, and thus the adhesiveness between the substrate film and the white film and between the white layer and the adhesive protective layer can be enhanced. Particularly, it is speculated that the interlayer adhesiveness between the white layer and the adhesive protective layer can be strengthened by an interaction between the aqueous binders. In addition, when an inorganic oxide filler is contained in the white layer, the adhesiveness is enhanced, and particularly, even in a hot and humid environment (for example, 85° C. and 85% RH), the adhesiveness does not easily decrease.

Since the white layer according to the invention is formed by applying an aqueous composition such as that described above, as compared with a white layer formed by affixing a film or a sheet formed by incorporating a white pigment into a resin thereto, it is not easy for a white pigment to be localized within the layer, and the white pigment is likely to be present uniformly in the layer. Therefore, it is speculated that the film for a solar cell back sheet of the invention having such a white layer is also excellent in sunlight reflection efficiency.

As such, the film for a solar cell back sheet of the invention has a light reflectivity or a decorative property suitable for use in solar cells, and is also excellent in adhesion to the main body of the cell (particularly, adhesion to the EVA-based sealing agent that seals the solar cell element), so that the film can be maintained stably without causing peeling or the like over time in a hot and humid environment, and it is possible to maintain the power generation performance in a stable manner over a long time.

Hereinafter, the invention will be described in more detail.

[Substrate Film]

The film for a solar cell back sheet of the invention has a substrate film.

There are no particular limitations on the material of the substrate film, and examples thereof that can be used include a polyester, a polyolefin such as polypropylene or polyethylene, and a fluorocarbon polymer such as polyvinyl fluoride.

Among them, a polyester is preferable from the viewpoints of cost, mechanical strength or the like.

The polyester is preferably a linear saturated polyester synthesized from an aromatic dibasic acid or an ester-forming derivative thereof, and a diol or an ester-forming derivative thereof.

Specific examples of such a linear saturated polyester include polyethylene terephthalate (PET), polyethylene isophthalate, polybutylene terephthalate, poly(1,4-cyclohexylenedimethylene terephthalate), and polyethylene-2,6-naphthalate.

Among these, polyethylene terephthalate or polyethylene-2,6-naphthalate is particularly preferable from the viewpoints of the balance between the mechanical properties and the cost.

The polyester may be a homopolymer or may be a copolymer. Furthermore, the polyester may be a mixture obtained by blending a small amount of a resin of different type from the polyester, for example, a polyimide.

The carboxy group content in the polyester is preferably 50 equivalents/t or less, and more preferably 35 equivalents/t or less. When the carboxy group content is 50 equivalents/t or less, the hydrolysis-resistant property can be maintained, and a decrease in the strength caused by moisture and heat over time, can be suppressed. The lower limit of the carboxy group content is desirably 2 equivalents/t, from the viewpoint of maintaining the adhesiveness of the polyester to the layers formed thereon (for example, the white layer).

The carboxy group content in the polyester can be adjusted by regulating the kind of the polymerization catalyst or the film forming conditions (film forming temperature or time).

In regard to the polymerization catalyst used when a polyester is produced, it is preferable to use a Sb-based, Ge-based or Ti-based compound, from the viewpoint of suppressing the carboxy group content to a predetermined range or below, but particularly a Ti-based compound is preferred. In the case in which a Ti-based compound is used, an embodiment that performs polymerization by using the Ti-based compound as a catalyst in an amount in the range of from 1 ppm to 30 ppm, and more preferably from 3 ppm to 15 ppm is preferable. When the proportion of the Ti-based compound is in the range described above, it is possible to adjust the amount of the terminal carboxy group in the range shown below, and the hydrolysis resistance of the polymer substrate can be maintained to be low.

The synthesis of a polyester using a Ti-based compound can be carried out by applying the methods described in, for example, Japanese Examined Patent Document No. 8-301198, Japanese Patent Nos. 2543624, 3335683, 3717380, 3897756, 3962226, 3979866, 3996871, 4000867, 4053837, 4127119, 4134710, 4159154, 4269704 and 4313538.

It is preferable that the polyester according to the invention is subjected to solid state polymerization, after being polymerized. Thereby, a preferable carboxy group content can be achieved. The solid state polymerization may be carried out by a continuous method (a method of packing the resin in a tower, allowing the resin to slowly flow for a predetermined time while heating the resin, and then discharging the resin), or by a batch method (a method of introducing the resin into a container, and heating the resin for a predetermined time). Specifically, the methods described in Japanese Patent Nos. 2621563, 3121876, 3136774, 3603585, 3616522, 3617340, 3680523, 3717392, and 4167159 can be applied to fixed-bed polymerization.

The temperature for the solid state polymerization is preferably from 170° C. to 240° C., more preferably from 180° C. to 230° C., and even more preferably from 190° C. to 220° C. Furthermore, the solid state polymerization time is preferably from 5 hours to 100 hours, more preferably from 10 hours to 75 hours, and even more preferably from 15 hours to 50 hours. Solid state polymerization is preferably carried out in a vacuum or in a nitrogen atmosphere.

A polyester substrate film is preferably a biaxially drawn film which is produced by, for example, melt extruding the polyester into a film form, cooling and solidifying the polyester film using a casting drum to obtain an undrawn film, drawing this undrawn film at a temperature ranging from the glass transition temperature Tg° C. to (Tg+60)° C., once or twice in the longitudinal direction, at a total drawing ratio of 3 to 6 times, and then drawing the resulting film at a temperature ranging from Tg° C. to (Tg+60)° C. in the width direction at a drawing ratio of 3 to 5 times.

A polyester film which has been optionally subjected to a heat treatment at 180° C. to 230° C. for 1 second to 60 seconds, may also be used.

The thickness of the substrate film is preferably 25 μm to 300 μm. When the thickness is 25 μm or greater, sufficient mechanical strength is obtained, and when the thickness is 300 μm or less, it is advantageous in terms of cost.

Particularly, a polyester substrate undergoes deterioration in the hydrolysis resistance as the thickness increases, and tends to become unsatisfactory for long-term use. Thus, according to the invention, when the thickness is from 120

μm to 300 μm, and the carboxy group content in the polyester is 2 equivalents/t to 50 equivalents/t, an effect of enhancing durability in moisture and heat is further provided.

<Formation of White Layer>

In the method for producing a film for a solar cell back sheet of the invention, a white layer is formed on a substrate film by applying an aqueous composition for a white layer containing a white pigment, a first aqueous binder and an inorganic oxide filler to at least one surface of the substrate film. That is, the aqueous composition for a white layer may be applied not only on one surface of the substrate film but also on both sides of the substrate film.

A first function of the white layer is to increase the power generation efficiency of the solar cell module by reflecting the portion of light that has arrived at the back sheet without being used for the power generation in the solar cell module, from the incident light, and returning the light to the solar cell module. A second function is to enhance the decorative property of the external appearance in the case in which the solar cell module is viewed from the front surface side. In general, when a solar cell module is viewed from the front surface side, the back sheet around the solar cell is seen, and thus the appearance can be improved by enhancing the decorative property by providing the back sheet with a white layer.

[Aqueous Composition for a White Layer]

The aqueous composition for a white layer can be prepared by mixing a white pigment, a first aqueous binder and an inorganic oxide filler, which will all be described later, as well as fine particles other than the inorganic oxide filler, a crosslinking agent and additives that can be optionally added, with a coating solvent.

Water is used as the coating solvent, and it is preferable that 60% by mass or more of the solvent contained in the aqueous composition for a white layer is water. This aqueous composition is preferable from the viewpoint that an aqueous composition does not easily place a burden on the environment, and when the proportion of water is 60% by mass or greater, it is advantageous in terms of an explosion proofing property and safety.

The proportion of water in the aqueous composition for a white layer is preferably even higher from the viewpoint of the environmental burden, and it is more preferable in the case in which water is contained at a proportion of 70% by mass or greater of the entire solvent.

Application of the aqueous composition for a white layer to the substrate film surface can be carried out using a known method such as, for example, a gravure coater or a bar coater.

The aqueous composition for a white layer is an aqueous composition for a white layer in which the volume fraction of the white pigment relative to the aqueous binder is 50% to 200%, from the viewpoints of the reflection performance and film strength, and it is preferable to apply the aqueous composition for a white layer on the substrate film such that the coating thickness is from 4 μm to 20 μm, and the amount of coating of the white pigment is from 3 g/m$^2$ to 10 g/m$^2$.

Hereinafter, the various components contained in the aqueous composition for a white layer will be described.

—White Pigment—

The aqueous composition for a white layer contains a white pigment.

There are no particular limitations on the white pigment, so long as it is a white-colored pigment, and the white pigment may be an inorganic pigment or an organic pigment.

Examples of the inorganic pigment include titanium oxide, barium sulfate, silicon oxide, aluminum oxide, magnesium oxide, calcium carbonate, kaolin, talc, indigo, Prussian blue, and carbon black, and examples of the organic pigment include phthalocyanine blue, and phthalocyanine green.

The volume average particle size of the white pigment is 0.03 μm to 0.8 μm, and more preferably 0.15 μm to 0.5 μm. When the volume average particle size of the white pigment is in this range, a decrease in the light reflection efficiency can be suppressed.

The content of the white pigment in the total solids content of the aqueous composition for a white layer is preferably 50% by mass to 98% by mass, and more preferably 70% by mass to 95% by mass, from the viewpoints of reflection efficiency, a decorative property and the surface state of the white layer.

The volume average particle size of the white pigment is a value measured by a laser diffraction/scattering type particle size distribution analyzer, LA950; trade name, manufactured by Horiba, Ltd.

The aqueous composition for a white layer may contain a colorant (pigment or dye) other than the white pigment, as long as the effects of the invention (particularly, reflectivity) are not impaired.

—Aqueous Binder—

The aqueous composition for a white layer contains an aqueous binder (a first aqueous binder).

There are no particularly limitations on the aqueous binder so long as the aqueous binder is a water-soluble resin, and for example, a polyolefin, polyurethane, polyvinyl alcohol (PVA), a polyacrylic (acrylic resin) and a polyester can be used.

Among them, from the viewpoint of durability, polyvinyl alcohol (PVA), an acrylic resin, and a polyolefin are preferable. As the acrylic resin, a composite resin of acrylic and silicone is also preferable.

Preferable examples of the aqueous binder include the following products.

Examples of the polyolefin include CHEMIPEARL S-120 and S-75N [all manufactured by Mitsui Chemicals, Inc].

Examples of the polyacrylic (acrylic resin) include JURYMER ET-410 and SEK-301 [all manufactured by Nihon Junyaku Co., Ltd.].

Examples of the composite resin of acrylic and silicone include CERANATE WSA1060, WSA1070 [all manufactured by DIC Corporation.] and H7620, H7630 and H7650 [all manufactured by Asahi Kasei Corporation].

Examples of the polyvinyl alcohol include PVA105 [manufactured by Kuraray Co., Ltd.].

The aqueous binders may be used singly or may be used as mixtures of plural kinds, but from the viewpoint of increasing the adhesiveness between the white layer and the adjacent substrate film or various layers, it is preferable to use two or more kinds such as polyvinyl alcohol and another aqueous binder.

The amount of the aqueous binder contained in the aqueous composition for a white layer is preferably in the range of from 15% by mass to 200% by mass, and more preferably 17% by mass to 100% by mass, relative to the total mass of the white pigment. When the amount of the aqueous binder is 15% by mass or higher, a white layer having strength can be obtained, and when the amount is 200% by mass or lower, a decrease in the reflection ratio and a decorative property can be suppressed.

—Inorganic Oxide Filler—

The aqueous composition for a white layer further contains an inorganic oxide filler.

Examples of the inorganic oxide filler include silica, magnesium oxide, and tin oxide.

Among them, tin oxide or silica is preferable since the decrease in the adhesiveness is small when the composition is exposed to a hot and humid atmosphere.

The volume average particle size of the inorganic oxide filler is preferably 10 nm to 700 nm, and more preferably 20 nm to 300 nm. When an inorganic oxide filler having an average particle size in this range is used, satisfactory ease of adhesiveness between the substrate film or the white layer such as the adhesive protective layer and an adjacent layer is obtained, and particularly, the adhesiveness to the adjacent layer in a hot and humid environment (for example, 85° C. and 85% RH) can be exhibited. The volume average particle size of the inorganic oxide filler is a value measured by a laser diffraction/scattering type particle size distribution analyzer, LA950; trade name, manufactured by Horiba, Ltd.

The shape of the fine particles is not particularly limited, and any of spherical, amorphous and needle-shaped particles and the like can be used.

The amount of the fine particles contained in the aqueous composition for a white layer is preferably 5% by mass to 400% by mass, and more preferably 50% by mass to 300% by mass, relative to the total mass of the aqueous binder in the white layer. When the amount of the fine particles is 5% by mass or higher, the adhesiveness is good when exposed to a hot and humid atmosphere, and when the amount is 400% by mass or lower, deterioration of the surface state of the white layer can be prevented.

—Crosslinking Agent—

The aqueous composition for a white layer preferably contains a crosslinking agent.

When the aqueous composition for a white layer contains a crosslinking agent, the crosslinking agent can crosslink the aqueous binder contained in the aqueous composition for a white layer and thus can form a white layer having adhesiveness and strength, which is preferable.

Examples of the crosslinking agent include epoxy-based, isocyanate-based, melamine-based, carbodiimide-based, and oxazoline-based crosslinking agents. Among these, from the viewpoint of securing adhesiveness over time when exposed to moisture and heat, particularly oxazoline-based crosslinking agents are preferable.

Examples of oxazoline-based cross-linking agents include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4.4'-dimethyl-2-oxazoline), 2,2'-p-phenylene-bis-(2-oxazoline), 2,2'-m-phenylene-bis-(2-oxazoline), 2,2'-m-phenylene-bis-(4.4'-dimethyl-2-oxazoline), bis-(2-oxazolinylcyclohexane)sulfide, bis-(2-oxazolinylnorbornane)sulfide, and the like. Further, (co)polymers of the above may be preferably used. Commercial products can be used as the oxazoline-based cross-linking agent. Examples of the commercial products include EPOCROS K2010E, K2020E, K2030E, WS500, WS700 (trade name, all manufactured by NIPPON SHOKUBAI CO., LTD), and the like.

The content of the crosslinking agent based on the total solids content mass of the aqueous composition for a white layer is preferably 5% by mass to 50% by mass, and more preferably 20% by mass to 40% by mass, based on the total mass of the aqueous binder. When the content of the crosslinking agent is 5% by mass or higher, sufficient crosslinking efficiency are obtained, and a decrease in the strength of the reflective layer or adhesion failure can be suppressed. On the other hand, when the content is 50% by mass or lower, a decrease in the pot life of the aqueous composition for a white layer can be prevented.

—Additives—

The aqueous composition for a white layer can contain various additives such as fine particles other than the inorganic oxide filler, an ultraviolet absorbent, an antioxidant, and a surfactant, and particularly, it is preferable to prepare the aqueous composition using a surfactant from the point of the dispersion stability of the white pigment, As the surfactant, known surfactants such as anionic, cationic and nonionic surfactants can be used, and specific examples include DEMOL EP [trade name, manufactured by Kao Corporation.] and NAROACTY CL95 [trade name, manufactured by Sanyo Chemical Industries, Ltd.]. The surfactants may be used singly, or plural kinds may be used together.

Examples of the fine particles other than the inorganic oxide filler, include calcium carbonate and magnesium carbonate.

(Formation of Undercoat Layer)

The method for producing a film for a solar cell back sheet of the invention may have, before forming the white layer on substrate film by applying an aqueous composition for a white layer to the substrate film, a step of forming an undercoat layer between the substrate film and the white film layer by applying an aqueous composition for an undercoat layer to the substrate film.

By having the undercoat layer between the substrate film and the white layer, the adhesiveness between the substrate film and the white layer can be further increased.

The aqueous composition for an undercoat layer preferably contains at least an aqueous binder (a second aqueous binder).

Examples of the aqueous binder that can be used include a polyester, a polyurethane, an acrylic resin, and a polyolefin. Furthermore, the aqueous composition may also contain, in addition to the aqueous binder, an epoxy-based, isocyanate-based, melamine-based, carbodiimide-based or oxazoline-based crosslinking agent, an anionic or nonionic surfactant, a filler such as silica, and the like.

The content of the aqueous binder in the total solids content mass of the aqueous composition for an undercoat layer is preferably 50% by mass to 100% by mass, and more preferably 70% by mass to 100% by mass.

There are no limitations on the method for applying the aqueous composition for an undercoat layer.

As the coating method, for example, a gravure coater or a bar coater can be used.

In regard to the amount of the aqueous composition for an undercoat layer to be coated, from the viewpoints of adhesiveness and surface state, it is preferable to apply the composition on the substrate film such that the layer thickness after drying is preferably 0.05 μm to 2 μm, and more preferably 0.1 μm to 1.5 μm.

As the coating solvent for the aqueous composition for an undercoat layer, water is used, and it is preferable to have 60% by mass or higher of water in the solvent that is contained in the aqueous composition for an undercoat layer. The aqueous composition is preferable since it is not likely to pose an environmental burden, and when the proportion of water is 60% by mass or higher, it is advantageous from the viewpoints of an explosion proofing property and safety.

The proportion of water in the aqueous composition for an undercoat layer is preferably even higher from the viewpoint of the environmental burden, and it is more preferable in the case in which water is contained at a proportion of 70% by mass or higher relative to the mass of the entire solvent.

<Formation of Adhesive Protective Layer>

The adhesive protective layer is formed by applying, to at least one surface of the substrate film, an aqueous composition for an adhesive protective layer containing an aqueous binder.

The adhesive protective layer may be formed by applying the aqueous composition for an adhesive protective layer on the white layer, or may be formed by applying, before forming the white layer by applying the aqueous composition for a white layer to the substrate film, the aqueous composition for an adhesive protective layer between the substrate film and the white layer.

The adhesive protective layer is usually a layer intended to firmly adhere the back sheet and the sealing material. Specifically, the adhesive power between the EVA (ethylene-vinyl acetate copolymer) and the sealing material is preferably 10 N/cm or greater, and more preferably 20 N/cm or greater.

Furthermore, it is preferable that peeling of the back sheet does not occur during the use of the solar cell module, and for that reason, it is preferable that the adhesive protective layer has high resistance to moisture and heat.

From this point of view, the adhesive protective layer is preferably formed on the outer side with respect to the white layer, and therefore, the adhesive protective layer is preferably formed on the white layer by applying, to at least one surface of the substrate film, an aqueous composition for a white layer containing a white pigment and an aqueous binder (a first aqueous binder) and an aqueous composition for an adhesive protective layer containing an aqueous binder (a second aqueous binder) so as to overlap in this order from the substrate film side. On the other hand, for the purpose of imparting strong adhesiveness to the substrate film, the adhesive protective layer may be formed on the substrate film before forming the white layer, and in this case, the white layer can be strongly adhered to the substrate film.

[Aqueous Composition for an Adhesive Protective Layer]

The aqueous composition for an adhesive protective layer contains at least an aqueous binder (a second aqueous binder).

The aqueous binder for the aqueous composition for an adhesive protective layer may be the same resin as the aqueous binder (the first aqueous binder) contained in the aqueous composition for a white layer, and from the viewpoint of durability, polyvinyl alcohol (PVA), an acrylic resin and a polyolefin are preferred. Furthermore, a composite resin of acrylic and silicone as an acrylic resin is also preferable.

Preferable examples of the aqueous binder include the products described as preferable examples of the aqueous binder contained in the aqueous composition for a white layer.

The content of the aqueous binder based on the total solids content mass of the aqueous composition for an adhesive protective layer is preferably 30% by mass to 100% by mass, and more preferably 40% by mass to 80% by mass, from the viewpoint of the adhesiveness between the adhesive protective layer and the adjacent layers.

The aqueous composition for an adhesive protective layer is preferably applied on the white layer (when other layer is formed between the white layer and the adhesive protective layer, on the other layer) so that the amount of the aqueous binder is 0.05 g/m$^2$ to 5 g/m$^2$, and more preferably 0.08 g/m$^2$ to 3 g/m$^2$.

When the amount of the aqueous binder is 0.05 g/m$^2$ or more, sufficient adhesive power is obtained, and when the amount of the aqueous binder is 5 g/m$^2$ or less, a satisfactory surface state is obtained.

The aqueous composition for an adhesive protective layer may contain a crosslinking agent for crosslinking the aqueous binder, a surfactant for stabilizing the dispersion of the constituent components of the aqueous composition for an adhesive protective layer, a known matting agent such as polystyrene or polymethyl methacrylate, an inorganic oxide filler and fine particles of an inorganic oxide filler such as described above, as well as an ultraviolet absorbent, an antioxidant and the like.

As the method of applying the aqueous composition for an adhesive protective layer on the white layer (when another layer is formed between the white layer and the adhesive protective layer, on this another layer), for example, a known method such as using a gravure coater or a bar coater can be used.

As the coating solvent of the aqueous composition for an adhesive protective layer, water is used as the coating solvent, and it is preferable that 60% by mass or more of the solvent contained in the aqueous composition for an adhesive protective layer is water. The aqueous composition is preferable from the viewpoint that an aqueous composition does not easily place a burden on the environment, and when the proportion of water is 60% by mass or more, it is advantageous in terms of explosion proofing property and safety.

The proportion of water in the aqueous composition for an adhesive protective layer is preferably even higher from the viewpoint of environmental burden, and it is more preferable in the case in which water is contained at a proportion of 70% by mass or more of the entire solvent.

(Formation of Weather Resistant Layer)

In regard to the method for producing a film for a solar cell back sheet of the invention, it is preferable to form a weather resistant layer on the surface opposite to the surface where the white layer and the adhesive protective layer is formed, by further applying an aqueous composition for a weather resistant layer containing at least one of a fluorocarbon resin and a silicone-acrylic composite resin.

Examples of the fluorocarbon resin contained in the aqueous composition for a weather resistant layer include polychlorotrifluoroethylene, polytetrafluoroethylene, polyhexafluoropropylene, polyvinylidene fluoride, polytrifluoroethylene, a chlorotrifluoroethylene-ethylene copolymer, a chlorotrifluoroethyelne-vinyl ether copolymer, and a tetrafluoroethylene-perfluoroalkyl vinyl ether copolymer. Among them, from the viewpoints of solubility and weather resistance, a chlorotrifluoroethyelne-vinyl ether copolymer is preferable.

The content of the fluororesin with respect to the total mass of the solids in the aqueous composition for a weather resistant layer is preferably 40% by mass to 90% by mass, more preferably 50% by mass to 80% by mass, from the viewpoints of weather resistance and film strength.

As the silicone-acrylic composite resin contained in the aqueous composition for a weather resistant layer, the same acrylic-silicone composite resins as those exemplified as the aqueous binder contained in the aqueous composition for a white layer can be used, and the same applies to the preferable examples thereof.

The content of the silicone-acrylic composite resin with respect to the total mass of the solids in the aqueous composition for a weather resistant layer is preferably 40% by mass to 90% by mass, and more preferably 50% by mass to 80% by mass, from the viewpoints of weather resistance and film strength.

The amount of the aqueous composition for a weather resistant layer to be coated preferably is set at 0.05 g/m² to 30 g/m², and more preferably set at 1 g/m² to 20 g/m², from the viewpoints of weather resistance and the adhesiveness to the substrate film.

There are no particular limitations on the method for applying the aqueous composition for a weather resistant layer.

As the coating method, for example, a gravure coater or a bar coater can be used.

Water is used as the coating solvent of the aqueous composition for a weather resistant layer, and it is preferable that 60% by mass or more of the solvent contained in the aqueous composition for a weather resistant layer is water. The aqueous composition is preferable from the viewpoint that an aqueous composition does not easily place a burden on the environment, and when the proportion of water is 60% by mass or more, it is advantageous in terms of explosion proofing property and safety.

The proportion of water in the aqueous composition for a weather resistant layer is preferably even higher from the viewpoint of environmental burden, and it is more preferable in the case in which water is contained at a proportion of 70% by mass or more of the entire solvent.

<Film for Solar Cell Back Sheet>

The film for a solar cell back sheet of the invention has, on at least one surface of the substrate film, a white layer formed from a coating film of an aqueous composition for a white layer containing a white pigment, an aqueous binder (a first aqueous binder) and an inorganic oxide filler, and an adhesive protective layer formed from a coating film of an aqueous composition for an adhesive protective layer containing an aqueous binder (a second aqueous binder), in this sequence from the substrate film side.

The film for a solar cell back sheet of the invention may optionally further have a weather resistant layer formed from a coating film of an aqueous composition for a weather resistant layer containing at least one of a fluorocarbon resin and a silicone-acrylic composite resin, or an undercoat layer formed from a coating film of an aqueous composition for an undercoat layer.

There are no particular limitations on the method for producing a film for a solar cell back sheet having the configuration described above, but it is preferable to carry out the production by the method for producing a film for a solar cell back sheet of the invention.

(White Layer)

For the white pigment, aqueous binder and inorganic oxide filler contained in the white layer, the white pigment, aqueous binder (the first aqueous binder) and inorganic oxide filler described above that are contained in the aqueous composition for a white layer can be used.

The applied amount of the white pigment in the white layer may vary with the type of the white pigment used or the average particle size, but the content is preferably 2.5 g/m² to 8.5 g/m², and preferably 4.5 g/m² to 7.5 g/m². When the applied amount of the white pigment is 2.5 g/m² or more, necessary coloration is obtained, and it is easy to exhibit reflectivity and a decorative property. Furthermore, when the content of the white pigment is 8.5 g/m² or less, the surface state of the white layer is satisfactory.

The amount of the aqueous binder contained in the white layer is the same as the amount of the aqueous binder contained in the aqueous composition for a white layer. That is, the amount of the aqueous binder is preferably in the range of 15% by mass to 200% by mass, and more preferably 17% by mass to 100% by mass, relative to the total mass of the white pigment in the white layer.

The shape and the amount of the inorganic oxide filler in the white layer is respectively the same as the shape and the amount of the inorganic oxide filler in the aqueous composition for a white layer, and the amount is preferably 5% by mass to 400% by mass, and more preferably 50% by mass to 300% by mass, relative to the total mass of the aqueous binder in the white layer.

The white layer may also contain various additives such as fine particles other than the inorganic oxide filler, an ultraviolet absorbent, an antioxidant, and a surfactant. Furthermore, unless the effects of the invention (particularly, reflectivity) are not impaired, the white layer may contain a colorant (pigment or dye) other than the white pigment.

The layer thickness of the white layer is preferably 1 μm to 20 μm, and more preferably 1.5 μm to 10 μm. When the thickness is adjusted to 1 μm or thicker, a sufficient decorative property or reflection ratio can be exhibited, and when the thickness is adjusted to 20 μm or less, deterioration of the surface state can be suppressed.

As described above, the white layer has a function of increasing the power generation efficiency by diffusely reflecting the portion of light that has bypassed the cell, from the sunlight entering through the front surface of the module, and thereby returning the reflected light to the cell. In order to exhibit such a function to a maximal degree, the surface of the substrate film where the white layer and the adhesive protective layer are formed (outermost surface) preferably has a light reflection ratio of 70% or higher for light having a wavelength of 550 nm. When the light reflection ratio is 70% or higher, the portion of light that has passed by the solar cell can be sufficiently returned to the cell, and it is preferable in view of increasing the power generation efficiency.

The light reflection ratio for light having a wavelength of 550 nm at the surface of the substrate film where the white layer and the adhesive protective layer are formed (outermost layer), can be adjusted to 75% or higher by controlling the amount of the white pigment in the white layer and the layer thickness to the value ranges described above.

[Adhesive Protective Layer]

As the aqueous binder contained in the adhesive protective layer, the aqueous binder described above contained in the aqueous composition for the adhesive protective layer can be used.

The amount of the aqueous binder in the adhesive protective layer is preferably 0.05 g/m² to 5 g/m², and more preferably 0.08 g/m² to 3 g/m².

When the amount of the aqueous binder is 0.05 g/m² or more, sufficient adhesive power is obtained, and when the amount of the aqueous binder is 5 g/m² or less, a satisfactory surface state is obtained.

The adhesive protective layer may contain various additives such as the inorganic oxide filler mentioned above and fine particles other than the inorganic oxide filler, an ultraviolet absorbent, an antioxidant, and a surfactant.

There are no particular limitations on the thickness of the adhesive protective layer, but the thickness is usually preferably 0.05 μm to 8 μm, and more preferably 0.1 μm to 5 μm. When the film thickness is 0.05 μm or thicker, necessary ease of adhesiveness is obtained, and when the thickness is 8 μm or less, deterioration of the surface state of the adhesive protective layer can be suppressed.

Furthermore, the adhesive protective layer is preferably transparent, in order not to reduce the effects of the white layer.

(Undercoat Layer and Weather Resistant Layer)

The film for a solar cell back sheet of the invention may have an undercoat layer between the substrate film and the white layer. Furthermore, the film may also have, on the surface of the substrate film opposite to the surface where the white layer and adhesive protective layer are formed, a weather resistant layer containing at least one of a fluorocarbon resin or a silicone-acrylic composite resin. The fluorocarbon resin and the silicone-acrylic composite resin contained in the weather resistant layer, and the contents thereof in the weather resistant layer are as described above.

The undercoat layer and the weather resistant layer may each independently contain various additives such as the inorganic oxide filler mentioned above and fine particles other than the inorganic oxide filler, an ultraviolet absorbent, an antioxidant, and a surfactant.

<Solar Cell Module>

The film for a solar cell back sheet produced by the method for producing a film for a solar cell back sheet of the invention, and the film for a solar cell back sheet of the invention are preferable for the production of a solar cell module.

A solar cell module is constructed by, for example, disposing a solar cell element that converts the light energy of sunlight to electrical energy, between a transparent substrate through which the sunlight enters and the film for a solar cell back sheet of the invention described above, and sealing the space between the substrate and the back sheet with a sealing material such as an ethylene-vinyl acetate-based sealing material.

The details of the members other than the solar cell module, solar cell body, and the back sheet are described in, for example, "Panel Materials for Photovoltaic System" (reviewed by Sugimoto Eiichi, published by Kogyo Chosakai Publishing, Inc., 2008).

The transparent substrate is acceptable if it has light transmissibility by which sunlight can be transmitted, and can be appropriately selected from the materials capable of transmitting light. From the viewpoint of power generation efficiency, a substrate having a higher light transmittance is more preferable, and as such a substrate, for example, a glass substrate, and a transparent resin such as an acrylic resin can be preferably used.

As the solar cell element, various known solar cell elements, such as silicon systems such as monocrystalline silicon, polycrystalline silicon, and amorphous silicon; and Group III-V or Group II-VI compound semiconductor systems such as copper-indium-gallium-selenium, copper-indium-selenium, cadmium-tellurium, and gallium-arsenic, can be applied. This application claims priority from Japanese Patent Application Nos. 2010-008597 filed on Jan. 18, 2010, the disclosure of which is incorporated by reference herein.

EXAMPLES

Hereinafter, the invention will be described more specifically based on Examples, but the invention is not limited to the following Examples so long as the gist is maintained. Unless particularly stated otherwise, the units "%" and "parts" are on a mass basis.

<Substrate Film>

—Synthesis of Polyester—

A slurry of 100 kg of high purity terephthalic acid (manufactured by Mitsui Chemicals, Inc.) and 45 kg of ethylene glycol (manufactured by Nippon Shokubai Co., Ltd.) was gradually supplied over 4 hours to an esterification reaction tank, in which about 123 kg of bis(hydroxyethyl)terephthalate had been previously introduced and which was maintained at a temperature of 250° C. and a pressure of $1.2 \times 10^5$ Pa. Even after completion of the supply, the esterification reaction was continued for another one hour. Subsequently, 123 kg of the esterification reaction product thus obtained was transferred to a polycondensation reaction tank.

Subsequently, ethylene glycol was added to the polycondensation reaction tank to which the esterification reaction product had been transferred, in an amount of 0.3% by mass based on the polymer thus obtained. After stirring for 5 minutes, an ethylene glycol solution of cobalt acetate and manganese acetate was added to the reaction tank to a concentration of 30 ppm and 15 ppm, respectively, based on the polymer obtained. After stirring the content for another 5 minutes, a 2% by mass ethylene glycol solution of a titanium alkoxide compound was added to the reaction tank to a concentration of 5 ppm based on the polymer obtained. After 5 minutes, a 10% by mass ethylene glycol solution of ethyl diethylphosphonoacetate was added to the polymer obtained to a concentration of 5 ppm. Thereafter, while the oligomers were stirred at 30 rpm, the reaction system was slowly heated from 250° C. to 285° C., and the pressure was also decreased to 40 Pa. The total time taken to reach the final temperature and the final pressure was 60 minutes. At a time point at which a predetermined stirring torque was reached, the reaction system was purged with nitrogen, the pressure was returned to normal pressure, and the polycondensation reaction was terminated. Then, the polymer was ejected in cold water into a strand form and was immediately cut to produce polymer pellets (diameter about 3 mm, length about 7 mm). The time taken from the initiation of pressure reduction to the predetermined stirring torque was 3 hours.

However, for the titanium alkoxide compound, the titanium alkoxide compound (Ti content=4.44% by mass) synthesized in Example 1 of JP-A- No. 2005-340616, paragraph [0083], was used.

—Solid State Polymerization—

The pellets thus obtained were stored in a vacuum container maintained at 40 Pa at a temperature of 220° C. for 30 hours, and thereby solid state polymerization was carried out.

—Formation of Base—

The pellets that had been subjected to solid state polymerization as described above were melted at 280° C., and the molten product was cast on a metal drum. Thus, an undrawn base having a thickness of about 3 mm was produced. Subsequently, biaxial drawing was performed by drawing the base at 90° C. to three times in the longitudinal direction, and further drawing the base at 120° C. to 3.3 times in the lateral direction. The base was thermally fixed at 240° C. for 10 minutes, and then was subjected to a corona discharge treatment on both surfaces. Thus a polyethylene terephthalate film (PET film) having a thickness of 188 μm was provided.

<Aqueous Composition for White Layer>

—Preparation of White Pigment Dispersion Liquid 1—

| | |
|---|---|
| Titanium dioxide (white pigment, volume average particle size 0.3 μm) [TIPAQUE R-780-2; trade name, manufactured by Ishihara Sangyo Kaisha, Ltd., solids content 100%] | 39.7% |
| Polyvinyl alcohol (aqueous binder B) [PVA-105; trade name, manufactured by Kuraray Co., Ltd., solids content 10%] | 49.7% |
| Surfactant [DEMOL EP; trade name, manufactured by Kao Corporation., solids content 25%] | 0.5% |
| Distilled water | 10.1% |

To the titanium dioxide, aqueous binder B and surfactant of the composition shown above, distilled water was added to adjust the total amount to 100%, and then the mixture was subjected to a dispersion treatment using a Dyno-Mill (trade name) type dispersing machine. Thus, a white pigment dispersion liquid 1 was prepared.

—Preparation of Aqueous Composition for White Layer 1—

| | |
|---|---|
| White pigment dispersion liquid 1 | 71.0% |
| Aqueous dispersion of polyacrylic resin (aqueous binder A1) [JURYMER ET410; trade name, manufactured by Nihon Junyaku Co., Ltd., solids content 30%] | 7.2% |
| Polyoxyalkylene alkyl ether (surfactant) [NAROACTY CL95; trade name, manufactured by Sanyo Chemical Industries, Ltd., solids content 1%] | 3.0% |
| Oxazoline compound (crosslinking agent) [EPOCROS WS-700; trade name, manufactured by Nippon Shokubai Co., Ltd., solids content 25%] | 2.0% |
| Silica filler (inorganic oxide filler, volume average particle size 40 nm) [AEROSIL OX-50; trade name, manufactured by Nippon Aerosil Co., Ltd., solids content 10%] | 1.8% |
| Distilled water | 15.0% |

The white pigment dispersion liquid 1, aqueous binder A1, surfactant, crosslinking agent and silica filler of the composition shown above were used, and the mixture was adjusted with distilled water to adjust the total amount to 100%. Thus, a coating liquid for white layer (aqueous composition for a white layer 1) was prepared.

—Preparation of Aqueous Composition for White Layer 2—

| | |
|---|---|
| White pigment dispersion 1 | 71.0% |
| Aqueous dispersion of polyolefin resin (aqueous binder A2) [CHEMIPEARL S75N; trade name, manufactured by Mitsui Chemicals, Inc., solids content 24%] | 9.0% |
| Polyoxyalkylene alkyl ether (surfactant) [NAROACTY CL95; trade name, manufactured by Sanyo Chemical Industries, Ltd., solids content 1%] | 3.0% |
| Oxazoline compound (crosslinking agent) [EPOCROS WS-700; trade name, manufactured by Nippon Shokubai Co., Ltd., solids content 25%] | 2.0% |
| Silica filler (inorganic oxide filler, volume average particle size 40 nm) [AEROSIL OX-50; trade name, manufactured by Nippon Aerosil Co., Ltd., solids content 10%] | 1.8% |
| Distilled water | 13.2% |

The white pigment dispersion liquid 1, aqueous binder A2, surfactant, crosslinking agent and silica filler of the composition shown above were used, and the mixture was adjusted with distilled water to adjust the total amount to 100%. Thus, a coating liquid for white layer (aqueous composition for a white layer 2) was prepared.

—Preparation of Aqueous Composition for White Layer 3—

| | |
|---|---|
| White pigment dispersion 1 | 80.0% |
| Aqueous dispersion of polyolefin resin (aqueous binder A2) [CHEMIPEARL S75N; trade name, manufactured by Mitsui Chemicals, Inc., solids content 24%] | 9.0% |
| Polyoxyalkylene alkyl ether (surfactant) [NAROACTY CL95; trade name, manufactured by Sanyo Chemical Industries, Ltd., solids content 1%] | 3.0% |
| Oxazoline compound (crosslinking agent) [EPOCROS WS-700; trade name, manufactured by Nippon Shokubai Co., Ltd., solids content 25%] | 2.0% |
| Silica filler (inorganic oxide filler, volume average particle size 40 nm) [AEROSIL OX-50; trade name, manufactured by Nippon Aerosil Co., Ltd., solids content 10%] | 1.8% |
| Distilled water | 4.2% |

The white pigment dispersion liquid 1, aqueous binder A2, surfactant, crosslinking agent and silica filler of the composition shown above were used, and the mixture was adjusted with distilled water to adjust the total amount to 100%. Thus, a coating liquid for white layer (aqueous composition for a white layer 3) was prepared.

—Preparation of Aqueous Composition for White Layer 4—

| | |
|---|---|
| White pigment dispersion 1 | 73.8% |
| Aqueous dispersion of polyacrylic resin (aqueous binder A1) [JURYMER ET410; trade name, manufactured by Nihon Junyaku Co., Ltd., solids content 30%] | 7.2% |
| Polyoxyalkylene alkyl ether (surfactant) [NAROACTY CL95; trade name, manufactured by Sanyo Chemical Industries, Ltd., solids content 1%] | 3.0% |
| Oxazoline compound (crosslinking agent) [EPOCROS WS-700; trade name, manufactured by Nippon Shokubai Co., Ltd., solids content 25%] | 2.8% |
| Distilled water | 13.2% |

The white pigment dispersion liquid 1, aqueous binder A1, surfactant and crosslinking agent shown above were used, and the mixture was adjusted with distilled water to adjust the total amount to 100%. Thus, a coating liquid for white layer (aqueous composition for a white layer 4) was prepared.

—Preparation of Aqueous Composition for White Layer 5—

| | |
|---|---|
| White pigment dispersion 1 | 73.8% |
| Aqueous dispersion of polyolefin resin (aqueous binder A2) [CHEMIPEARL S75N; trade name, manufactured by Mitsui Chemicals, Inc., solids content 24%] | 9.0% |
| Polyoxyalkylene alkyl ether (surfactant) [NAROACTY CL95; trade name, manufactured by Sanyo Chemical Industries, Ltd., solids content 1%] | 3.0% |
| Oxazoline compound (crosslinking agent) [EPOCROS WS-700; trade name, manufactured by Nippon Shokubai Co., Ltd., solids content 25%] | 2.8% |
| Distilled water | 11.4% |

The white pigment dispersion liquid 1, aqueous binder A2, surfactant and crosslinking agent shown above were used, and the mixture was adjusted with distilled water to adjust the total amount to 100%. Thus, a coating liquid for white layer (aqueous composition for a white layer 5) was prepared.

—Preparation of Aqueous Composition for White Layer 6—

| | |
|---|---:|
| White pigment dispersion 1 | 34.8% |
| Aqueous dispersion of polyolefin resin (aqueous binder A2) [CHEMIPEARL S75N; trade name, manufactured by Mitsui Chemicals, Inc., solids content 24%] | 12.0% |
| Polyoxyalkylene alkyl ether (surfactant) [NAROACTY CL95; trade name, manufactured by Sanyo Chemical Industries, Ltd., solids content 1%] | 3.0% |
| Distilled water | 50.2% |

The white pigment dispersion liquid 1, aqueous binder A2 and surfactant shown above were used, and the mixture was adjusted with distilled water to adjust the total amount to 100%. Thus, a coating liquid for white layer (aqueous composition for a white layer 6) was prepared.

<Aqueous Composition for Adhesive Protective Layer>

—Aqueous Composition for an Adhesive Protective Layer 1—

| | |
|---|---:|
| Aqueous dispersion of polyolefin resin (aqueous binder dispersion liquid) [CHEMIPEARL S75N; trade name, manufactured by Mitsui Chemicals, Inc., solids content 24%] | 5.2% |
| Polyoxyalkylene alkyl ether (surfactant) [NAROACTY CL95; trade name, manufactured by Sanyo Chemical Industries, Ltd., solids content 1%] | 7.8% |
| Oxazoline compound (crosslinking agent) [EPOCROS WS-700; trade name, manufactured by Nippon Shokubai Co., Ltd., solids content 25%] | 0.8% |
| Distilled water | 86.2% |

To the aqueous binder dispersion liquid, surfactant and crosslinking agent of the composition shown above, distilled water was added to adjust the total amount to 100%. Thus, a coating liquid for adhesive protective layer (aqueous composition for an adhesive protective layer 1) was prepared.

—Aqueous Composition for Adhesive Protective Layer 2—

| | |
|---|---:|
| Polyester resin (aqueous binder) [VYLONAL MD-1200; trade name, manufactured by Toyobo Co., Ltd., solids content 17%] | 1.7% |
| Polyester resin (aqueous binder) [PESRESIN A-520; trade name, manufactured by Takamatsu Oil & Fat Co., Ltd., solids content 30%] | 3.8% |
| Polyoxyalkylene alkyl ether (surfactant) [NAROACTY CL95; trade name, manufactured by Sanyo Chemical Industries, Ltd., solids content 1%] | 1.5% |
| Carbodiimide compound (crosslinking agent) [CARBODILITE V-02-L2; trade name, manufactured by Nisshinbo Chemical, Inc., solids content 10%] | 1.3% |
| Distilled water | 91.7% |

To the aqueous binder, surfactant and crosslinking agent of the composition shown above, distilled water was added to adjust the total amount to 100%. Thus, a coating liquid for adhesive protective layer (aqueous composition for an adhesive protective layer 2) was prepared.

Example 1

The aqueous composition for a white layer 1 was applied on the substrate film, and was dried at 180° C. for one minute. Thus, a white layer having an amount of coating of 7 g/m$^2$ was formed. The aqueous composition for an adhesive protective layer 1 was further applied on the white layer thus obtained, and was dried at 180° C. for one minute. Thus, an adhesive protective layer 1 having an amount of coating of 0.1 g/m2 was formed. Thus, a film sheet for a solar cell back sheet 1 of Example 1 was produced.

Example 2 to Example 4, and Comparative Example 1 to Comparative Example 5

The aqueous composition for an adhesive protective layer 2, the aqueous compositions for white layer 2 to 6, and the aqueous composition for an adhesive protective layer 1 were applied such that the respective components described in the following Table 1 were present in the amounts indicated in the following Table 1. The aqueous composition for an adhesive protective layer 2, the aqueous compositions for white layer 2 to 6, and the aqueous composition for an adhesive protective layer 1 were all dried at 180° C. for one minute after the application. As such, film sheets for a solar cell back sheet 2 to 4 of Examples 2 to 4, and film sheets 7 to 11 for a solar cell back sheet of Comparative Examples 1 to 5 were produced.

The details of the components and amount of coating for the respective layers of the respective film sheets for solar cell back sheets are described in Table 1.

TABLE 1

| | | | | | White Layer | | | | | | | |
|---|---|---|---|---|---|---|---|---|---|---|---|---|
| | | | | | | | | | White Pigment | | | |
| | | Adhesive | Aqueous | | Aqueous Binder | | | | Volume | Cross- | | Adhesive |
| | | Protective | Composition | Coating | | | A + B | | Fraction | linking | | Protective |
| | Film | Layer 2 | for White | Thickness | | A | B | Total | | (based on | Agent | Filler | Layer 1 |
| | Sheet | Amount | Layer | [μm] | Kind | Amount | Amount | Amount | Amount | binder) | Amount | Amount | Amount |
| Example 1 | 1 | none | 1 | 6.7 | A1 | 0.45 | 0.74 | 1.19 | 5.8 | 115% | 0.1 | 0.04 | 0.1 |
| Example 2 | 2 | none | 2 | 6.7 | A2 | 0.45 | 0.74 | 1.19 | 5.8 | 115% | 0.1 | 0.04 | 0.1 |
| Example 3 | 3 | 0.1 | 3 | 7.6 | A2 | 0.45 | 0.83 | 1.28 | 6.6 | 121% | 0.1 | 0.04 | none |
| Example 4 | 4 | 0.1 | 3 | 7.6 | A2 | 0.45 | 0.83 | 1.28 | 6.6 | 121% | 0.1 | 0.04 | 0.1 |
| Comp. Exp. 1 | 7 | none | 3 | 7.6 | A2 | 0.45 | 0.83 | 1.28 | 6.6 | 121% | 0.1 | 0.04 | none |
| Comp. Exp. 2 | 8 | none | 4 | 7.0 | A1 | 0.45 | 0.76 | 1.21 | 6.1 | 119% | 0.15 | none | none |

TABLE 1-continued

| | | | White Layer | | | | | | | |
|---|---|---|---|---|---|---|---|---|---|---|
| | | | | | | | White Pigment | | | |
| | | Adhesive Protective Layer 2 | Aqueous Composition for White Layer | Coating Thickness | Aqueous Binder | | | | Volume Fraction (based on binder) | Cross-linking Agent | Filler | Adhesive Protective Layer 1 |
| | Film Sheet | Amount | | [μm] | Kind | Amount A | Amount B | A + B Total Amount | Amount | Amount | Amount | Amount |
| Comp. Exp. 3 | 9 | none | 4 | 7.0 | A1 | 0.45 | 0.76 | 1.21 | 6.1 | 119% | 0.15 | none | 0.1 |
| Comp. Exp. 4 | 10 | none | 5 | 7.0 | A2 | 0.45 | 0.76 | 1.21 | 6.1 | 119% | 0.15 | none | 0.1 |
| Comp. Exp. 5 | 11 | none | 6 | 3.2 | A2 | 0.60 | 0.36 | 0.96 | 2.8 | 69% | none | none | none |

In Table 1, the "adhesive protective layer 1" is a layer formed by applying the aqueous composition for an adhesive protective layer 1, and the "adhesive protective layer 2" is a layer formed by applying the aqueous composition for an adhesive protective layer 2. Furthermore, the terms "amount" and "total amount" all represent the amount of coating [g/m$^2$], and the unit for the coating thickness is [μm]. Furthermore, the term "volume fraction (based on binder)" represents the volume fraction of the white pigment relative to the aqueous binder in the white layer.

Example 5

The aqueous composition for the first weather resistant layer 1, and the aqueous composition for the second weather resistant layer were applied (after drying) in this sequence on the surface of the film for a solar cell back sheet 1 of Example 1 opposite to the surface where the white layer was formed, in an amount of 3.0 g/m$^2$ and 2.0 g/m$^2$, respectively. As such, a film sheet for a solar cell back sheet 5 of Example 5 having the first weather resistant layer 1 and the second weather resistant layer laminated thereon, was produced.

—Aqueous Composition for First Weather Resistant Layer 1—

| | |
|---|---|
| Silicone-acrylic composite resin | 35.7% |
| [CERANATE WSA-1070; trade name, manufactured by DIC Corporation., solids content 40%] | |
| Polyoxyalkylene alkyl ether (surfactant) | 2.0% |
| [NAROACTY CL95; trade name, manufactured by Sanyo Chemical Industries, Ltd., solids content 1%] | |
| Oxazoline compound (crosslinking agent) | 5.7% |
| [EPOCROS WS-700; trade name, manufactured by Nippon Shokubai Co., Ltd., solids content 25%] | |
| Distilled water | 56.6% |

—Aqueous Composition for Second Weather Resistant Layer—

| | |
|---|---|
| Fluororesin | 26.1% |
| [OBBLIGATO SW0011F; trade name, manufactured by Agc Coat-tech Co., Ltd., solids content 39%] | |
| Polyoxyalkylene alkyl ether (surfactant) | 2.0% |
| [NAROACTY CL95; trade name, manufactured by Sanyo Chemical Industries, Ltd., solids content 1%] | |
| Carbodiimide compound (crosslinking agent) | 10.2% |
| [CARBODILITE V-02-L2; trade name, manufactured by Nisshinbo Chemical, Inc., solids content 10%] | |
| Distilled water | 61.7% |

Example 6

The aqueous composition for the first weather resistant layer 2, and the aqueous composition for the second weather resistant layer were applied (after drying) in this sequence on the surface of the film for a solar cell back sheet 1 of Example 1 opposite to the surface where the white layer was formed, in an amount of 3.0 g/m$^2$ and 2.0 g/m$^2$, respectively. As such, a film sheet for a solar cell back sheet 6 of Example 6 having the first weather resistant layer 2 and the second weather resistant layer laminated thereon, was produced.

—Aqueous Composition for First Weather Resistant Layer 2—

| | |
|---|---|
| Silicone-acrylic composite resin | 35.8% |
| [CERANATE WSA-1070; trade name, manufactured by DIC Corporation., solids content 40%] | |
| Polyoxyalkylene alkyl ether (surfactant) | 2.0% |
| [NAROACTY CL95; trade name, manufactured by Sanyo Chemical Industries, Ltd., solids content 1%] | |
| Oxazoline compound (crosslinking agent) | 5.7% |
| [EPOCROS WS-700; trade name, manufactured by Nippon Shokubai Co., Ltd., solids content 25%] | |
| Distilled water | 56.5% |

Comparative Example 6

On the substrate film, a commercially available white PET film [E20-50 μm, manufactured by Toray Industries, Inc.] (film thickness 50 μm) was adhered by a dry lamination method using an adhesive for dry lamination 1. Thus, a film sheet for a solar cell back sheet 12 of Comparative Example 6 was produced.

For the adhesive for dry lamination 1, the adhesive described in Example 1 of JP-A No. 2008-211034 [a urethane-based adhesive obtained by mixing TAKELAC A315 (trade name; 100 parts) and TAKENATE A50 (trade name; 10 parts) manufactured by Mitsui Chemicals Polyurethane, Inc.] was used, and this adhesive was applied on the substrate film so as to obtain an amount of coating of 3 g/m$^2$ in terms of solids content.

Comparative Example 7

The adhesive for dry lamination 1 was applied on the surface of the film sheet for a solar cell back sheet 6 opposite to the white film, and a PET film exhibiting weather resistance [X10S; trade name, manufactured by Toray Industries, Inc.] (film thickness 125 μm) was adhered thereto by a dry lamination method. Thus, a film sheet for a solar cell back sheet 13 of Comparative Example 7 was produced.

Comparative Example 8

An aqueous composition for a first adhesive layer having the following composition, and an aqueous composition for a second adhesive layer were applied (after drying) in this sequence, on a commercially available white film [E20-50 μm; trade name, manufactured by TORAY INDUSTRIES, INC.] (film thickness 50 μm), in an amount of 0.5 g/m² and 0.2 g/m², respectively. Specifically, the composition is as follows.

—Aqueous Composition for First Adhesive Layer—

| | |
|---|---|
| Aqueous dispersion of polyolefin resin (aqueous binder) [CHEMIPEARL S75N; trade name, manufactured by Mitsui Chemicals, Inc., solids content 24%] | 2.4% |
| Polyoxyalkylene alkyl ether (surfactant) [NAROACTY CL95; trade name, manufactured by Sanyo Chemical Industries, Ltd., solids content 1%] | 6.3% |
| Oxazoline compound (crosslinking agent) [EPOCROS WS-700; trade name, manufactured by Nippon Shokubai Co., Ltd., solids content 25%] | 0.7% |
| Colloidal silica [SNOWTEX CM; trade name, manufactured by Nissan Chemical Industries, Ltd., solids content 30%] | 3.1% |
| Silica filler (inorganic oxide filler, volume average particle size 40 nm) [AEROSIL OX-50; trade name, manufactured by Nippon Aerosil Co., Ltd., solids content 10%] | 9.2% |
| Distilled water | 78.3% |

The aqueous composition for the first adhesive layer having the composition shown above was applied on a white film (E20-50 μm; trade name, manufactured by Toray Industries, Inc.), and was dried at 180° C. for one minute. Thus, a first adhesive layer having an amount of coating of 0.5 g/m² was formed.

—Aqueous Composition for the Second Adhesive Layer—

| | |
|---|---|
| Aqueous dispersion of polyolefin resin (aqueous binder) [CHEMIPEARL S120; trade name, manufactured by Mitsui Chemicals, Inc., solids content 27%] | 2.3% |
| Polyoxyalkylene alkyl ether (surfactant) [NAROACTY CL95; trade name, manufactured by Sanyo Chemical Industries, Ltd., solids content 1%] | 7.7% |
| Epoxy compound (crosslinking agent) [DENACOL EX-614B; trade name, manufactured by Nagase ChemteX Corporation., solids content 1%] | 22.2% |
| Colloidal silica [SNOWTEX C; trade name, manufactured by Nissan Chemical Industries, Ltd., solids content 20%] | 1.5% |
| Distilled water | 66.3% |

The aqueous composition for the second adhesive layer having the composition shown above was applied on the first adhesive layer and was dried at 180° C. for one minute. Thus, a second adhesive layer having an amount of coating of 0.2 g/m² was formed.

Thereafter, the adhesive for dry lamination 1 was applied on the surface opposite to the surface applied with the adhesive layer, and a PET film exhibiting weather resistance [X10S; trade name, manufactured by Toray Industries, Inc.] (film thickness 125 μm) was adhered thereto by a dry lamination method. Thus, a film sheet for a solar cell back sheet 14 of Comparative Example 8 was produced.

<Evaluation>

The film sheet layer configuration of the films for a solar cell back sheet 1 to 14 thus obtained, the number of films used, the production method, and the number of production steps, are indicated in Table 2. The films for a solar cell back sheet 1 to 14 were subjected to evaluation with respect to the production efficiency, light reflection ratio, adhesion evaluation and abrasion resistance, and the evaluation results are shown in Table 3. In Table 2, "Comp. Exp.", "APL", "WR", "NFS", "NPS", and "AFI" respectively denote Comparative Example, Adhesive protective layer, Weather resistant, Number of film sheets, Number of production steps, and Adhesive agent for film integration.

1. Production Efficiency

The production efficiency was evaluated based on the numerical value obtained by adding the number of film sheets required for producing the film sheet of the invention and the number of production steps. The number of production steps was taken as one in the case in which the production was carried out only by a coating system, and was taken as two in the case in which a lamination method for laminating films was also required. It is needless to say that a smaller number of production steps leads to better production efficiency.

2. Light Reflection Ratio

The films for a solar cell back sheet 1 to 14 were irradiated with light having a wavelength of 550 nm using a spectrophotometer UV-2450 [trade name, manufactured by Shimadzu Corp.] equipped with an integrating sphere attachment ISR-2200 [trade name, manufactured by Shimadzu Corp.], and thus the reflection ratio at a wavelength of 550 nm was measured. The reflection ratio of a barium sulfate standard sheet was measured as a reference, and this was taken as 100% to calculate the reflection ratio of the sample sheets.

The acceptable range of the reflection ratio is 70% or higher, and preferably 75% or higher.

3. Adhesion Evaluation

—Sample Production—

The films for a solar cell back sheet 1 to 14 were cut to a size of 20 mm in width and 150 mm in length. Two sheets of sample pieces were provided, and these sample pieces were arranged so that the adhesive protective layers 1 (white layer, in the case in which the film did not have the adhesive protective layer 1) of the two sheets faced each other in the inside. An EVA sheet (SC50B; trade name, EVA sheet manufactured by Mitsui Chemicals Fabro, Inc.) which was cut to a size of 20 mm in width and 100 mm in length was interposed between the adhesive protective layers, and the assembly was adhered by hot pressing with a vacuum laminator (manufactured by Nisshinbo Chemical, Inc., vacuum laminator). Thus, EVA was adhered to the adhesive protective layer 1 (white layer, if the film did not have the adhesive protective layer 1). The adhesion conditions used at that time are as follows.

A sample was vacuum drawn at 128° C. for 3 minutes using a vacuum laminator, and then the sample was pressed for 2 minutes to achieve provisional adhesion. Subsequently, a main adhesion treatment was carried out in a dry oven at 150° C. for 30 minutes. As such, there was obtained a sample for adhesion evaluation in which the portion 20 mm away from one edge of the sample piece obtained by adhering two sheets, was not adhered with EVA, and the EVA sheet was adhered to the remaining portion which measured 100 mm in width.

—Moisture Heat Treatment—

The sample for adhesion evaluation thus obtained was left to stand in an environment of 85° C. and 85% RH for 1000 hours. This hot and humid condition is considered as a significantly severe condition as a use environment for conventional solar cell back sheets, and is an accelerating condition for evaluating the long-term reliability of the back sheet. In Table 3, "MHT" denotes the moisture heat treatment in the environment of 85° C. and 85% RH for 1000 hours.

—Evaluation of Adhesive Power—

The evaluation of adhesive power was carried out by placing the portion not adhered with EVA between the upper and lower clips in a Tensilon (RTC-1210A; trade name, manufactured by Orientec Co., Ltd.), and the sample was pulled at a peeling angle of 180° and a tensile rate of 300 mm/min. Furthermore, the evaluation was carried out using a sample prior to a moisture and heat treatment (Fresh) and a sample after a moisture and heat treatment.

AA: Adhesion is very good (60 N or greater/20 mm)
A: Adhesion is good (from 20 N to less than 60 N/20 mm)
B: Adhesion is slightly poor (from 10 N to less than 20 N/20 mm)
C: Adhesion is failed (less than 10 N/20 mm)

4. Abrasion Resistance

The films for a solar cell back sheet 1 to 14 were stored for 2 hours in an atmosphere of 25° C. and 65% RH, and then a black paper was provided on the adhesive protective layer (or white layer) of the film. A load of 1 kg/cm in width was applied on the black paper, and an abrasion test was performed at a rate of 25 cm/min. The scratches of the film obtained after the abrasion test and dusting of the respective coating layers (white layer and adhesive protective layers) were evaluated.

5: No scratches or dusting
4: Slight scratches and dusting observed
3: Scratches and dusting observed to some extent
2: Scratches and dusting observed
1: Scratches and dusting observed to a fairly large extent.

As can be seen from Table 3, the film sheet for a solar cell back sheet 14 of Comparative Example 8 used a commercially available functional film and was evaluated to be equivalent to the film sheets for a solar cell back sheet of the Examples in terms of light reflection ratio, adhesiveness to EVA and abrasion resistance. However, since the film sheet of the Comparative Example was produced by film affixing, the production efficiency of the film sheets for a solar cell back sheet of the present Examples is superior. Furthermore, the film sheets for a solar cell back sheet of the Examples, which contained inorganic oxide filler in the white layer, were superior in the adhesiveness to EVA as compared to the film sheets for a solar cell back sheet 8 to 13 of the Comparative Examples, which did not contain an inorganic oxide filler in the white layer.

<Weather Resistance Evaluation>

The film for a solar cell back sheet 5 and the film for a solar cell back sheet 6 were evaluated regarding the weather resistance of the films, by performing a color change test

TABLE 2

| | Film Sheet | Film Sheet Configuration | | | NFS | Production Method | NPS |
| --- | --- | --- | --- | --- | --- | --- | --- |
| | | Front Surface Side | Base Material | Rear Surface Side | | | |
| Example 1 | 1 | White layer/APL 1 | 188 μm PET Film | none | 1 | Coating | 1 |
| Example 2 | 2 | White layer/APL 1 | 188 μm PET Film | none | 1 | Coating | 1 |
| Example 3 | 3 | White layer/APL 2 | 188 μm PET Film | none | 1 | Coating | 1 |
| Example 4 | 4 | White layer APL 1/APL 2 | 188 μm PET Film | none | 1 | Coating | 1 |
| Example 5 | 5 | White layer/APL 1 | 188 μm PET Film | Weather resistant Layer | 1 | Coating | 1 |
| Example 6 | 6 | White layer/APL 1 | 188 μm PET Film | Weather resistant Layer | 1 | Coating | 1 |
| Comp. Exp. 1 | 7 | White layer | 188 μm PET Film | none | 1 | Coating | 1 |
| Comp. Exp. 2 | 8 | White layer | 188 μm PET Film | none | 1 | Coating | 1 |
| Comp. Exp. 3 | 9 | White layer/APL 1 | 188 μm PET Film | none | 1 | Coating | 1 |
| Comp. Exp. 4 | 10 | White layer/APL 1 | 188 μm PET Film | none | 1 | Coating | 1 |
| Comp. Exp. 5 | 11 | White layer | 188 μm PET Film | none | 1 | Coating | 1 |
| Comp. Exp. 6 | 12 | 50 μm White PET Film | 188 μm PET Film | none | 2 | AAFI Coating and Film Lamination | 2 |
| Comp. Exp. 7 | 13 | 50 μm White PET Film | 188 μm PET Film | 125 μm WR PET Film | 3 | AAFI Coating and Film Lamination | 2 |
| Comp. Exp. 8 | 14 | 50 μm White PET Film with EVA Adhesive layer | 188 μm PET Film | 125 μm WR PET Film | 3 | AAFI Coating EVA Adhesive layer and Film Lamination | 2 |

TABLE 3

| | Film Sheet | Production Efficiency | Light Reflection Ratio [%] | Adhesive Power to EVA | | Abrasion Resistance |
| --- | --- | --- | --- | --- | --- | --- |
| | | | | Fresh | After MHT | |
| Example 1 | 1 | 2 | 80.5 | A | After | 5 |
| Example 2 | 2 | 2 | 80.8 | A | After | 5 |
| Example 3 | 3 | 2 | 83.0 | A | AA | 4 |
| Example 4 | 4 | 2 | 83.0 | A | AA | 5 |
| Example 5 | 5 | 2 | 80.5 | A | A | 5 |
| Example 6 | 6 | 2 | 80.5 | A | A | 5 |
| Comp. Exp. 1 | 7 | 2 | 83.1 | C | B | 2 |
| Comp. Exp. 2 | 8 | 2 | 83.1 | C | C | 3 |
| Comp. Exp. 3 | 9 | 2 | 82.7 | B | C | 5 |
| Comp. Exp. 4 | 10 | 2 | 85.4 | C | C | 5 |
| Comp. Exp. 5 | 11 | 2 | 66.9 | C | C | 5 |
| Comp. Exp. 6 | 12 | 4 | 81.0 | C | C | 5 |
| Comp. Exp. 7 | 13 | 5 | 81.0 | C | C | 5 |
| Comp. Exp. 8 | 14 | 5 | 81.0 | A | A | 5 | using a SUNSHINE WEATHER-O-METER (trade name, manufactured by Suga Test Instruments Co., Ltd.) for 1000 hours. The films all exhibited excellent weather resistance.

According to the invention, a film for a solar cell back sheet having excellent production efficiency, having a white pigment uniformly present in the layers, and having excellent adhesiveness between the respective layers, and a method for producing the film can be provided.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

The invention claimed is:

1. A film for a solar cell back sheet comprising:
a substrate film comprising a polyester, and having a thickness of from 25 µm to 300 µm;
a white layer provided directly on at least one surface of the substrate film and comprising a coating film of an aqueous composition for the white layer comprising:
a white pigment,
a first aqueous binder, and
an inorganic oxide filler having a volume average particle size of from 10 nm to 700 nm; and
an adhesive protective layer provided on the white layer and comprising a coating film of an aqueous composition for the adhesive protective layer comprising a second aqueous binder,
wherein:
the white pigment comprises at least one selected from the group consisting of titanium oxide, barium sulfate, aluminum oxide, calcium carbonate, kaolin and talc;
the first aqueous binder comprises at least one selected from the group consisting of polyolefin, polyurethane, polyvinyl alcohol, a polyacrylic and a polyester;
the inorganic oxide filler comprises at least one selected from the group consisting of silica, magnesium oxide and tin oxide;
the second aqueous binder comprises at least one selected from the group consisting of polyolefin, polyurethane, polyvinyl alcohol, a polyacrylic and a polyester; and
the substrate film, the white layer, and the adhesive protective layer are adjacent in this order.

2. The film for a solar cell back sheet according to claim 1, wherein a volume fraction of the white pigment in the aqueous composition for the white layer is in a range of from 50% to 200% relative to the first aqueous binder, a film thickness of the white layer is in a range of from 4 µm to 20 µm, and a coating amount of the white pigment is in a range of from 3 g/m$^2$ to 10 g/m$^2$.

3. The film for a solar cell back sheet according to claim 1, wherein a content of the inorganic oxide filler is in a range of from 5% by mass to 400% by mass relative to a total amount of the first aqueous binder in the white layer.

4. The film for a solar cell back sheet according to claim 3, wherein a light reflection ratio of the at least one surface side of the substrate film at which the white layer and the adhesive protective layer are provided is 70% or higher with respect to light having a wavelength of 550 nm.

5. The film for a solar cell back sheet according to claim 3, further comprising a weather resistant layer comprising a coating film of an aqueous composition for the weather resistant layer comprising at least one of a fluorocarbon resin or a silicone-acrylic composite resin, and provided on a surface opposite to the at least one surface at which the white layer and the adhesive protective layer are provided.

6. The film for a solar cell back sheet according to claim 5, wherein a light reflection ratio of the at least one surface side of the substrate film at which the white layer and the adhesive protective layer are formed is 70% or higher with respect to light having a wavelength of 550 nm.

7. The film for a solar cell back sheet according to claim 1, further comprising a weather resistant layer comprising a coating film of an aqueous composition for the weather resistant layer comprising at least one of a fluorocarbon resin or a silicone-acrylic composite resin, and provided on a surface opposite to the at least one surface at which the white layer and the adhesive protective layer are provided.

8. The film for a solar cell back sheet according to claim 7, wherein a light reflection ratio of the at least one surface side of the substrate film at which the white layer and the adhesive protective layer are formed is 70% or higher with respect to light having a wavelength of 550 nm.

9. The film for a solar cell back sheet according to claim 1, wherein the adhesive protective layer further comprises an inorganic oxide filler.

10. The film for a solar cell back sheet according to claim 1, wherein:
the white pigment comprises titanium oxide;
the first aqueous binder comprises at least one selected from the group consisting of polyolefin, polyvinyl alcohol, and a polyacrylic;
the inorganic oxide filler comprises silica;
a content of the second aqueous binder is from 30% by mass to 100% by mass with respect to a total solid content of the aqueous composition;
the second aqueous binder comprises at least one selected from the group consisting of polyolefin and a polyester; and
the coating film of an aqueous composition for the adhesive protective layer comprises a crosslinking agent including at least one selected from the group consisting of a carbodiimide-based crosslinking agent and an oxazoline-based crosslinking agent.

11. A method for producing the film for a solar cell back sheet of claim 1, comprising: forming the white layer directly on the substrate film by applying the aqueous composition for the white layer comprising the white pigment, the first aqueous binder and the inorganic oxide filler to at least one surface of the substrate film; and forming the adhesive protective layer on the white layer by applying the aqueous composition for the adhesive protective layer comprising the second aqueous binder to the at least one surface of the white layer.

12. The method for producing the film for a solar cell back sheet according to claim 11, wherein a volume fraction of the white pigment in the aqueous composition for the white layer is in a range of from 50% to 200% relative to the first aqueous binder, and the aqueous composition for the white layer is applied to the substrate film such that a coating thickness of the aqueous composition for the white layer is in a range of from 4 μm to 20 μm, and a coating amount of the white pigment is in a range of from 3 g/m² to 10 g/m².

13. The method for producing the film for a solar cell back sheet according to claim 11, wherein a content of the inorganic oxide filler is in a range of from 5% by mass to 400% by mass relative to a total amount of the first aqueous binder in the aqueous composition for the white layer.

14. The method for producing the film for a solar cell back sheet according to claim 13, wherein a light reflection ratio of the at least one surface side of the substrate film at which the white layer and the adhesive protective layer are formed is 70% or higher with respect to light having a wavelength of 550 nm.

15. The method for producing a film for a solar cell back sheet according to claim 13, further comprising applying an aqueous composition for a weather resistant layer comprising at least one of a fluorocarbon resin or a silicone-acrylic composite resin, to a surface opposite to the at least one surface at which the white layer and the adhesive protective layer are formed.

16. The method for producing a film for a solar cell back sheet according to claim 15, wherein a light reflection ratio of the at least one surface side of the substrate film at which the white layer and the adhesive protective layer are formed is 70% or higher with respect to light having a wavelength of 550 nm.

17. The method for producing a film for a solar cell back sheet according to claim 15, wherein the aqueous composition for the white layer further comprises at least one surfactant.

18. The method for producing the film for a solar cell back sheet according to claim 11, further comprising applying an aqueous composition for a weather resistant layer comprising at least one of a fluorocarbon resin or a silicone-acrylic composite resin, to a surface opposite to the at least one surface at which the white layer and the adhesive protective layer are formed.

19. The method for producing the film for a solar cell back sheet according to claim 18, wherein the aqueous composition for the white layer further comprises at least one surfactant.

20. The method for producing a film for a solar cell back sheet according to claim 18, wherein a light reflection ratio of the at least one surface side of the substrate film at which the white layer and the adhesive protective layer are formed is 70% or higher with respect to light having a wavelength of 550 nm.

21. The method for producing the film for a solar cell back sheet according to claim 11, wherein the first aqueous binder and the second aqueous binder respectively independently comprise at least one selected from the group consisting of polyolefin, polyurethane, polyvinyl alcohol, (meth)acrylic polymer and polyester.

22. The method for producing the film for a solar cell back sheet according to claim 21, wherein the aqueous composition for the adhesive protective layer further comprises an inorganic oxide filler.

* * * * *